Figure 5:
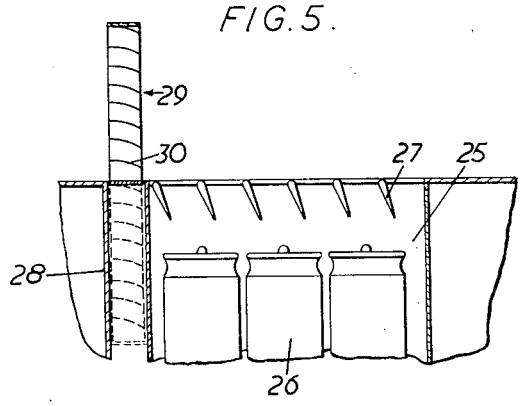

Aug. 22, 1961  T. H. KERRY  2,997,257
AIRCRAFT WITH VERTICAL LIFT ENGINES AND
DEFLECTING INTAKES THEREFOR
Filed Jan. 5, 1960  3 Sheets-Sheet 1
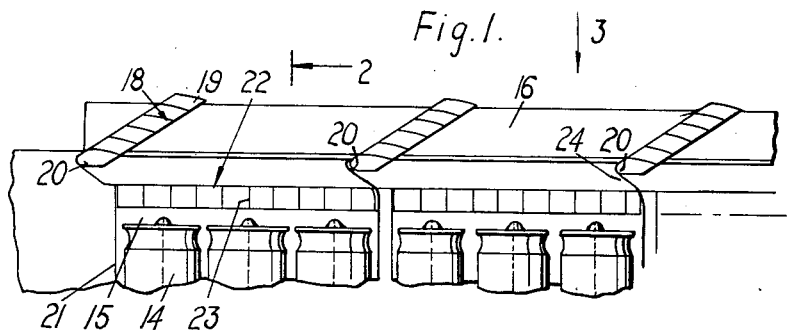
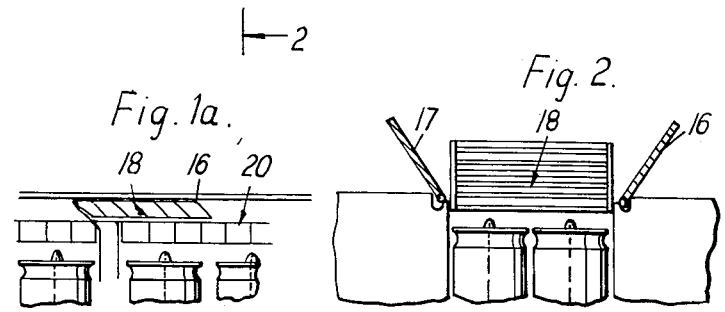
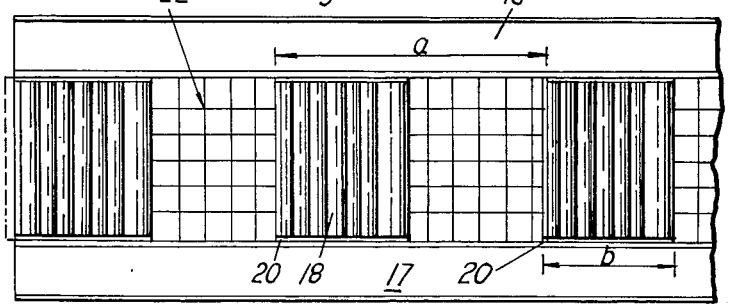
Inventor:
Thomas Henry Kerry,
By
Cushman, Darby & Cushman
Attorneys.

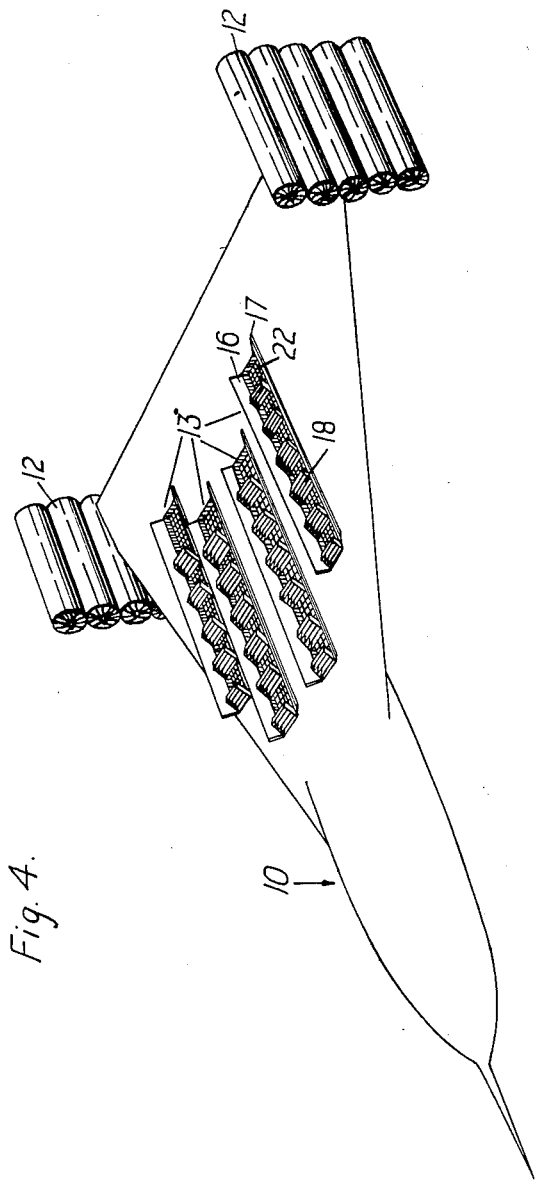

Inventor:
Thomas Henry Kerry,
By
Cushman, Darby & Cushman
Attorneys

United States Patent Office 2,997,257
Patented Aug. 22, 1961

2,997,257
AIRCRAFT WITH VERTICAL LIFT ENGINES AND DEFLECTING INTAKES THEREFOR
Thomas Henry Kerry, Derby, England, assignor to Rolls-Royce Limited, Derby, England, a company of Great Britain
Filed Jan. 5, 1960, Ser. No. 616
Claims priority, application Great Britian Jan. 8, 1959
12 Claims. (Cl. 244—23)

This invention concerns aircraft adapted for vertical take-off and landing.

Such aircraft may be provided, in addition to forward propulsion engines, with vertical lift engines which are employed during take-off and landing of the aircraft. The term "vertical lift engines," as used in this specification, is to be understood to mean engines arranged to produce lift forces on the aircraft independently of lift forces generated aerodynamically by forward flight.

In order to start the vertical lift engines when it is required to land the aircraft, it is necessary to direct an adequate supply of air into the air intakes of all the vertical lift engines. It is therefore the object of the present invention to provide an arrangement which shall be satisfactory in this respect.

According to the present invention in its broadest form an aircraft has a plurality of vertical lift engines, as hereinbefore defined, there being provided for each vertical lift engine or bank of such engines a guide vane structure which is of such length and is so positionable that, during forward flight of the aircraft, ambient air is directed into the intakes of such engine or bank of engines without the guide vane structure substantially interfering with air flow to adjacent engines or banks of engines.

In its preferred form the invention comprises an aircraft having a plurality of engine bays in each of which is mounted at least one vertical lift engine, as hereinbefore defined, there being provided for each bay a guide vane structure which is so positionable that, during forward flight of the aircraft, ambient air is directed into the intakes of the engine or engines in the bay, corresponding points on each respective guide vane structure and on any guide vane structure disposed longitudinally downstream thereof being spaced by a distance substantially exceeding the effective length of the said respective structure. By "effective length" is meant the length of a guide vane structure which, in the fully open position of the said structure, is open to the ambient air.

Preferably the said corresponding points are spaced by a distance equal to at least twice the length of the said respective structure.

Each guide vane structure is preferably mounted at the forward end of its engine bay and is movable between an open position, in which the ambient air is deflected into the engine intake or intakes, and a closed position in which it is not so deflected. At least one of the guide vane structures is preferably constituted by a grid provided with arcuate vanes.

There may be a plurality of longitudinally spaced vertical lift engines in each bay, the downstream ends of the bays being shaped to assist in directing air into the stern engines of each bay.

The invention is illustrated, merely by way of example, in the accompanying drawings, in which:

FIGURE 1 is a broken away longitudinal section through a set of banks of vertical lift engines, said banks forming part of the aircraft shown in FIGURE 4 and being provided with guide vane structures which are shown in their open positions, FIGURE 1a is a view of part of the structure illustrated in FIGURE 1 but showing a guide vane structure in the closed position, FIGURE 2 is a broken away section taken on the line 2—2 of FIGURE 1, FIGURE 3 is a broken away plan looking in the direction of the arrow 3 of FIGURE 1, FIGURE 4 is a diagrammatic perspective view of an aircraft provided with the structure shown in FIGURES 1–3, and FIGURES 5 and 6 are respectively a broken away section and a perspective view of a bank of vertical lift engines provided with a modified guide vane structure.

Referring first to FIGURE 4, a supersonic velocity vertical take-off aircraft 10 has a wing structure 11 of substantially delta shape. Arranged adjacent each end of the trailing edge of the wing structure 11 is a bank of five vertically spaced, forward propulsion engines 12, which are constituted by gas-turbine jet-reaction engines.

Spaced transversely of each other across the wing structure 11 are four sets 13 of banks of vertical lift engines 14 (see FIGURES 1 and 2) which are arranged to produce lift forces on the aircraft independently of lift forces generated aerodynamically by forward flight. The vertical lift engines 14 are constituted by gas-turbine, jet-reaction engines and each bank of such engines is mounted within a bay 15 and comprises six engines arranged in two longitudinally extending rows. As will be clearly seen from FIGURE 4, each set 13 comprises a number of banks of engines 14 arranged in line longitudinally of the aircraft.

The upper end of each bay 15 is provided with a pair of doors 16, 17 and another pair of such doors (not shown) are also provided at the lower end of each bay. Means, such for example as double acting air-operated jacks, not shown, are provided for opening and closing the doors. The doors 16, 17 are shown in their open positions; when, however, the doors are in their closed positions, they present surfaces in continuity with the general aerodynamic profile of the aircraft.

A guide vane structure 18, constituted by a grid provided with arcuate vanes 19, is pivotally mounted within the upper part of each of the bays 15, each guide vane structure 18, being mounted for movement about a pivot axis 20 disposed adjacent the forward end 21 of the respective engine bay 15.

The guide vane structures 18 are adapted to be moved (e.g. by double acting, air-operated jacks, not shown) between the "open," or inclined position shown in FIGURE 1 and the "closed" position shown in FIGURE 1a in which they are disposed horizontally and inwardly of the closed doors 16, 17.

It will be noted from FIGURE 3 that the pivot axes 20 of the guide vane structures 18 shown therein are spaced from each other by distances $a$ equal to somewhat more than twice the length $b$ of the structures 18.

There is disposed between the guide vane structure 18 of each bay and the engines 14 thereof a fixed grid 22 the bars of which have vertically disposed faces 23.

When it is required to land the aircraft, the doors 16, 17 and guide vane structures 18 are moved to their open positions. The aircraft will, at this stage, still be in forward flight. Accordingly the ambient air flowing over the upper surface of the aircraft will be deflected by the bars 19 and faces 23 into the air intakes of the engines 14. The downstream ends 24 of the bays 15 are, moreover, shaped as shown in FIGURE 1 to assist in directing air into the stern engines of each bay. There will, therefore, be a sufficient supply of air to permit lighting of the engines 14 and, of course, once the engines 14 are so lit air will be sucked thereby into the engine intakes so that it will not be necessary to maintain forward flight in order to keep the engines alight.

Since the guide vane structures 18 occupy somewhat less than half the length of a bank of vertical lift engines, the guide vane structure of one bank will not unduly interfere with the supply of air to any bank or banks longitudinally downstream thereof.

The present invention permits the vertical lift engines 14 to be compactly arranged in the aircraft since the engines do not have to be spaced apart from each other in order to allow room for means whereby air may be deflected into their intakes.

Figure 6:
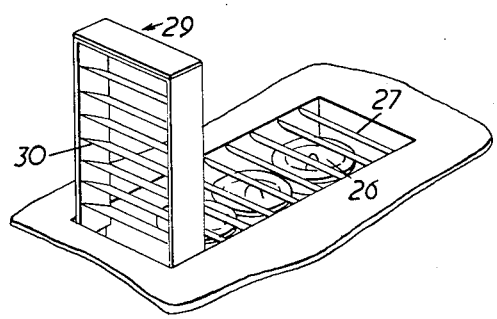

A modification of the invention is illustrated in FIGURES 5 and 6 in which there is shown an engine bay 25 within which are mounted three vertical lift engines 26. The bay 25 is provided with a fixed grid comprising a plurality of parallel, inclined vanes 27 which extend transversely of the aircraft. The vanes 27 are of aerofoil shape and are all of the same length.

Mounted for vertical sliding movement in a recess 28 at the forward end of the bay 25 is a guide vane structure 29. The latter may be moved (e.g. by a piston cylinder mechanism, not shown) between the open position shown and a closed position in which it is wholly disposed within the recess 28. The guide vane structure 29 is provided with arcuate vanes 30 which, in the open position and in forward flight, serve to direct ambient air onto to vanes 27 and so into the intakes of the engines 26.

I claim:

1. An aircraft comprising: a body, a plurality of vertical lift engines arranged in said body longitudinally of the aircraft, an intake passage and an exhaust passage in said body for said engines, a plurality of guide vane structures arranged longitudinally of the aircraft and positioned to direct ambient air into the intake of the engines during forward flight of the aircraft, said guide vane structures having corresponding points on adjacent guide vane structures longitudinally spaced by a distance substantially exceeding an effective length of each guide vane structure whereby flow of ambient air directed by one guide vane structure is without interference from the next adjacent guide vane structure spaced immediately upstream of the one guide vane structure.

2. An aircraft comprising: a body having a plurality of engine bays arranged longitudinally thereof, at least one vertical lift engine mounted in each bay, a guide vane structure for each engine bay positioned to direct ambient air into intakes of the lift engines therein during forward flight of the aircraft, said guide vane structures being spaced longitudinally of each other, said guide vane structures having corresponding points on each guide vane structure and the next adjacent guide vane structure disposed longitudinally downstream thereof spaced by a distance substantially exceeding the effective length of each guide vane structure whereby flow of ambient air directed by one guide vane structure is without interference from the next adjacent guide vane structure spaced immediately upstream of the one guide vane structure.

3. An aircraft as claimed in claim 2 in which at least one of the guide vane structures comprises a grid formed of a plurality of spaced arcuate vanes.

4. An aircraft, as claimed in claim 2, wherein said distance between corresponding points is at least twice the effective length of each vane structure.

5. An aircraft comprising: a body having a plurality of engine bays arranged longitudinally of the same, a plurality of longitudinally spaced vertical lift engines mounted in each bay, each of said bays having an end downstream of the same shaped to direct ambient air into the stern engines of the respective bay, a guide vane structure for each engine bay positioned to direct ambient air into intakes of the engines therein during forward flight of the aircraft, said guide vane structures having corresponding points on each guide vane structure and the next adjacent guide vane structure disposed longitudinally downstream thereof spaced by a distance substantially exceeding the effective length of each guide vane structure whereby flow of ambient air directed by one guide vane structure is without interference from the next adjacent guide vane structure spaced immediately upstream of the one guide vane structure.

6. An aircraft comprising: a body having a plurality of engine bays arranged longitudinally of the same, at least one vertical lift engine mounted in each engine bay, a guide vane structure for each engine bay, one guide vane structure being arranged with respect to the other longitudinally of the aircraft, each guide vane structure being movable from an inoperative position to an operative position for directing ambient air into intakes of the engines during forward flight of the aircraft, said guide vane structures, when in the position for directing ambient air, having corresponding points on each guide vane structure and the next adjacent guide vane structure disposed longitudinally downstream thereof spaced by a distance substantially exceeding the effective length of each guide vane structure whereby flow of ambient air directed by one guide vane structure is without interference from the next adjacent guide vane structure spaced immediately upstream of the one guide vane structure.

7. An aircraft comprising: a body having a plurality of engine bays arranged longitudinally of the same, at least one vertical lift engine mounted in each engine bay, a vertically slidable guide vane structure for each engine bay, each guide vane structure being slidable from an inoperative position to an operative position for deflecting ambient air into intakes of the engines during forward flight of the aircraft, said spaced guide vane structures having corresponding points on each guide vane structure and the next adjacent guide vane structure disposed longitudinally downstream thereof spaced by a distance substantially exceeding the effective length of each guide vane structure whereby flow of ambient air directed by one guide vane structure is without interference from the next adjacent guide vane structure spaced immediately upstream of the one guide vane structure.

8. An aircraft as claimed in claim 7 including a fixed grid carried in each engine bay above the lift engines therein, said fixed grid cooperating with the vertically slidable guide van structure of the respective engine bay when the guide vane structure is in the operative position to receive and direct the ambient air into intakes of the engines in the respective engine bays.

9. An aircraft as claimed in claim 8 in which each of said fixed grids includes a plurality of inclined vanes of equal length.

10. An aircraft comprising: a body having a plurality of engine bays arranged longitudinally of the same, at least one vertical lift engine mounted in each engine bay, a pivotally mounted guide vane structure for each engine bay, each guide vane structure being pivotable from an inoperative position to an operative position for directing ambient air into intakes of the engines in the respective engine bay during forward flight of the aircraft, said guide vane structures being arranged with respect to each other longitudinally of the aircraft and having corresponding points on each guide vane structure and the next adjacent guide vane structure disposed longitudinally downstream thereof spaced by a distance substantially exceeding the effective length of each guide vane structure whereby flow of ambient air directed by one guide vane structure is without interference from the next adjacent guide vane structure spaced immediately upstream of the one guide vane structure.

11. An aircraft as in claim 10 including at least one door for the upper end of each engine bay and means for opening and closing said door.

12. An aircraft comprising: a body having a plurality of rows of engine bays disposed transversely of the same, the engine bays of each row extending longitudinally of the body, a plurality of vertical lift engines in each engine bay, a guide vane structure for each engine bay, said guide vane structures of the engine bays of one row being spaced longitudinally of the body, each of said guide vane structures being positioned to direct ambient air into intake of the lift engines within the respective engine bay during forward flight of the aircraft, said longitudinally spaced guide vane structures having corresponding points on adjacent guide vane structures in the same row longitudinally spaced by a distance substantially exceeding an effective length of each guide vane structure whereby flow of ambient air directed by one guide vane structure is without interference from the next adjacent guide vane structure spaced immediately upstream of the one guide vane structure.

References Cited in the file of this patent

UNITED STATES PATENTS 2,936,969  Griffith ---------------- May 17, 1960

FOREIGN PATENTS 211,429  Australia ---------------- Nov. 14, 1957
244-12   France ------------------ Oct. 19, 1959